United States Patent
Dambrot et al.

(10) Patent No.: US 12,301,617 B2
(45) Date of Patent: May 13, 2025

(54) SYSTEM AND METHOD FOR IMPLEMENTING AN ARTIFICIAL INTELLIGENCE SECURITY PLATFORM

(71) Applicant: CRANIUM AI, INC., Short Hills, NJ (US)

(72) Inventors: Jonathan Dambrot, Chester, NJ (US); Daniel Scott Christman, New York, NY (US); Paul Spicer, Randolph, NJ (US)

(73) Assignee: Cranium AI, Inc., Short Hills, NJ (US)

( * ) Notice: Subject to any disclaimer, the term of this patent is extended or adjusted under 35 U.S.C. 154(b) by 278 days.

(21) Appl. No.: 18/112,166

(22) Filed: Feb. 21, 2023

(65) Prior Publication Data
US 2023/0269272 A1    Aug. 24, 2023

Related U.S. Application Data

(60) Provisional application No. 63/268,294, filed on Feb. 21, 2022.

(51) Int. Cl.
*H04L 9/40*    (2022.01)
*H04L 41/16*    (2022.01)

(52) U.S. Cl.
CPC .......... *H04L 63/1466* (2013.01); *H04L 41/16* (2013.01); *H04L 63/1433* (2013.01)

(58) Field of Classification Search
CPC ............................ H04L 63/1466; H04L 41/16
See application file for complete search history.

(56) References Cited

U.S. PATENT DOCUMENTS

| | | | |
|---|---|---|---|
| 11,973,784 B1* | 4/2024 | Erlingsson | G06F 9/5077 |
| 12,126,643 B1* | 10/2024 | Skarphedinsson | G06F 16/9024 |
| 2016/0173521 A1* | 6/2016 | Yampolskiy | G06F 21/56 726/25 |
| 2017/0063890 A1* | 3/2017 | Muddu | G06F 3/04847 |
| 2023/0308459 A1* | 9/2023 | Crabtree | H04L 63/1416 |
| 2023/0362200 A1* | 11/2023 | Crabtree | G06F 16/2477 |
| 2023/0412626 A1* | 12/2023 | Wright | H04L 41/16 |
| 2023/0421582 A1* | 12/2023 | McCarthy | H04L 63/1425 |
| 2024/0064159 A1* | 2/2024 | Crabtree | H04L 63/1466 |
| 2024/0244068 A1* | 7/2024 | Crabtree | H04L 63/08 |
| 2024/0364749 A1* | 10/2024 | Crabtree | H04L 63/20 |

* cited by examiner

*Primary Examiner* — Stephen T Gundry
(74) *Attorney, Agent, or Firm* — Faegre Drinker Biddle & Reath LLP

(57) ABSTRACT

An embodiment of the present invention is directed to implementing an AI security platform that secures AI/ML models while keeping the configuration and implementation simple and streamlined. An embodiment of the present invention is directed to delivering visibility on AI models across an entire organization.

20 Claims, 16 Drawing Sheets

Create New Pipeline

Welcome! Let's get started by gathering some information about the ML pipeline you'd like to add.

Pipeline name
_____

Description
This ML will automate responses from a chat bot for guest website visitors.
_____

Business Criticality
High ⌄

Cancel    Next step →

Save progress

Figure 11

Notable events

| | | | |
|---|---|---|---|
| 154 Notable Events | ⬢ 1554 Affected assets | 36 High Urgency | 17 Medium Urgency | 101 Low Urgency |

[All pipelines ▾] [Last 7 days ▾] [Active events ▾]   🔍 Search.....

Activity

| ☐ Urgency | Pipeline | Type | Subject | Criticality | Confidence | Created on | |
|---|---|---|---|---|---|---|---|
| ☐ HIGH | ACME 339814 | Data poisoning | Suspicious datapoin... | • HIGH | 99 | 01/25/22, 3:00 AM | ... |
| ☐ HIGH | STARK 974 | Data poisoning | Suspicious datapoin... | • HIGH | 93 | 01/25/22, 3:00 AM | ... |
| ☐ HIGH | Co123 28732 | Data poisoning | Suspicious datapoin... | • HIGH | 56 | 01/25/22, 3:00 AM | ... |
| ☐ HIGH | CyberABC 2159 | Data poisoning | Suspicious datapoin... | • HIGH | 99 | 01/25/22, 3:00 AM | ... |
| ☐ HIGH | ACME 126987 | Data poisoning | Suspicious datapoin... | • MEDIUM | 61 | 01/25/22, 3:00 AM | ... |
| ☐ HIGH | COMPA 09735 | Data poisoning | Suspicious datapoin... | • MEDIUM | 33 | 01/25/22, 3:00 AM | ... |
| ☐ HIGH | XYZ Corp 375 | Data poisoning | Suspicious datapoin... | • MEDIUM | 92 | 01/25/22, 3:00 AM | ... |

Figure 12

< Data poisoning – Suspicious activity

🛡 Suspicious data points

| | | | |
|---|---|---|---|
| | | Assign | Alert team | Create incident |

Pipeline affected
ACME 1234

Urgency
HIGH

Created on
01/25/22, 3:00 AM

Status
Active •

Criticality
• HIGH

Confidence Score
99

Team
○○○

Type
Data poisoning

Description
Suspicious data points detected in DS-ACME_Demo. 9.87% of dataset is affected Affected assets
CH-corpVM100-Dev
DS-ACME_Demo Recommended next steps
Remediation resources

Activity log

| Time | User | Activity |
|---|---|---|
| 🛡 01/25/22, 3:00 AM | ○ Chris J. | Removed record from dataset DS-ACME_Demo |
| 🛡 01/25/22, 1:00 AM | ○ Katie F. | Updated DS-ACME_Demo |

Figure 13

Business Details

Select the tags that describe this pipeline the best

Your tags

[Manufacturing x] [R&D x] [Project C x]

Criticality
- High
- Unselected
- Low

Industry
- Pharma
- Finance
- Healthcare
- Transportation
- Advertising
- Manufacturing

Business Function
- R&D
- Production
- Sales
- Logistics
- Operations
- Financial

Project
- Project A
- This Is Project B
- Project C
- Name Of Project
- Other Project
- Add Tag +

← Go back   [Skip] [Next step →]

45% Progress

① Pipeline details
② System architecture
③ Team Manager
④ Business details
⑤ Cloud assets
⑥ Other integrations

[Save progress]

? Get help

Figure 14

Cloud Assets

Select the assets you want to add to your pipeline

Pipelines (3)   Models (15)   Datasets (64)

⊕ pipeline-one-cloud-asset — 2 models • 12 Datasets ⌃

⊕ pipeline-two-newest-asset — 3 models • 24 Datasets ⌃

⊕ pipeline-three-Google-cloud — 1 model • 15 Datasets ⌄

⊕ Model-one-in-pipeline-three

⊕ DS_one_model1_pipeline3 — 12.548 datapoints • 1.2 GB

⊕ DS_one_model1_pipeline3 — 12.548 datapoints • 1.2 GB

⊕ DS_one_model1_pipeline3 — 12.548 datapoints • 1.2 GB

⊕ DS_one_model1_pipeline3 — 12.548 datapoints • 1.2 GB

Save progress

← Go back    [Skip]  [Next step →]

65% Progress

- Pipeline details
- System architecture
- Team Manager
- Business details
- ⑤ Cloud assets
- ⑥ Other integrations ? Get help

Figure 15

SYSTEM AND METHOD FOR IMPLEMENTING AN ARTIFICIAL INTELLIGENCE SECURITY PLATFORM

CROSS-REFERENCE TO RELATED APPLICATION

This application claims priority to U.S. Provisional Application Ser. No. 63/268,294, filed Feb. 21, 2022, the contents of which are incorporated by reference herein in their entirety.

FIELD OF THE INVENTION

The present invention relates to an artificial intelligence (AI) platform to simplify AI security for enterprise and other applications.

BACKGROUND

Artificial Intelligence represents one of the largest and fastest-growing segments in the software sector. As these technologies advance, companies will increase the use of AI and data in order to create competitive advantages.

More than half of global enterprises use AI in at least one business function. The global AI software industry is expected to double in size in just a few years. Industrial manufacturing, financial services, technology, retail and life sciences are adopting AI at the fastest rate.

Projections indicate that 75% of organizations will shift from piloting to operationalizing AI. In fact, AI is projected to increase productivity levels by approximately 40% across front-end and back-end processes. This change in momentum will be driven by greater accessibility to data and development of highly flexible models to adapt to specific business needs. Regulators are taking notice of the increased use of AI and developing regulatory compliance frameworks to protect stakeholders. Accordingly, the industry is expected to experience an increased use of AI, creation of large amounts of data, prevalence of cyber-attacks and the passing of regulation.

The implementation of AI and ML models into business processes is rapidly accelerating. However, industry practitioners are not equipped to protect, detect and respond to attacks on their AI and ML models. Companies leveraging AI and ML models are expected to adapt to rapidly changing regulatory landscape.

In the current industry, there is an assumption that AI/ML implementations are already secure. However, standards and protocols do not adequately address AI platform security. In addition, there is diversity in the type of models as well as AI implementations that run on a variety of different ecosystems. Current AI implementations are very complex with no standardization.

It would be desirable, therefore, to have a system and method that could overcome the foregoing disadvantages of known systems.

SUMMARY

According to an embodiment, the invention relates to a computer-implemented system and method for implementing an Artificial Intelligence (AI) security platform. The system comprises: a security center platform that serves as a central administrative software-as-a-service (SaaS) portal and collects and aggregates telemetry data across one or more AI implementations; an interactive user interface that is configured to provide an analytics dashboard to track the one or more AI implementations and identify one or more adversarial security issues; and a computer server that comprises a computer processor coupled to the interactive user interface and the security center platform wherein the computer server further comprises: a data integrity module configured to provide data security and integrity in the one or more AI implementations and further provide adversarial protection; a platform configuration monitoring interface configured to provide configuration monitoring associated with the one or more AI implementations; and a model security module configured to provide insights on how one or more models are performing from a security perspective and further provide model awareness and abnormal model behavior analytics.

According to another embodiment, the invention relates to a computer-implemented system for implementing an AI security platform. The system comprises: a core security platform that comprises a computer processor that communicates with an API gateway, a container orchestration platform and at least one memory component; an interface that communicates with one or more collector agents that receive data from one or more AI Services; an asset discovery engine configured to collect metadata relating to one or more assets used for development and delivery of at least one AI pipeline, wherein the metadata relates to asset types, activity, data source and model; and an analysis engine configured to monitor the one or more AI Services, the one or more assets and the at least one AI pipeline to identify potential threats from adversarial attacks by generating at least one security score that measures a security posture of an entity wherein the at least one security score is based on one or more of: security incidents, alerts and security findings.

According to another embodiment, the invention relates to a computer-implemented method for implementing an AI security platform. The method comprises the steps of: communicating, via one or more collector agents, with one or more AI Services; collecting, via an asset discovery engine, metadata relating to one or more assets used for development and delivery of at least one AI pipeline, wherein the metadata relates to asset types, activity, data source and model; monitoring, via an analysis engine, the one or more AI Services, the one or more assets and the at least one AI pipeline to identify potential threats from an adversarial attack; generating, via the analysis engine, at least one security score that measure a security posture of an entity wherein the at least one security score is based on one or more of: security incidents, alerts and security findings; and providing, via an interface, security health data that represents the security posture of the entity wherein the security health data comprises the at least one security score.

As companies increasingly invest in AI systems, security and model performance will be key concerns. An embodiment of the present invention is directed to understanding various aspects of AI including security, performance, optimization, bias, etc. With the various embodiments of the present invention, entities are able to reach a point where they are comfortable with AI in core and critical business processes. The innovative system seeks to break down AI silos to gain a deeper understanding of AI portfolios.

These and other advantages will be described more fully in the following detailed description.

BRIEF DESCRIPTION OF THE DRAWINGS

In order to facilitate a fuller understanding of the present invention, reference is now made to the attached drawings.

The drawings should not be construed as limiting the present invention, but are intended only to illustrate different aspects and embodiments of the invention.

FIG. 11 is an exemplary illustration of a new pipeline creation interface, according to an embodiment of the present invention.

FIG. 12 is an exemplary illustration of a notable events interface, according to an embodiment of the present invention.

FIG. 13 is an exemplary illustration of a suspicious activity interface, according to an embodiment of the present invention.

FIG. 14 is an exemplary illustration of a business details interface, according to an embodiment of the present invention.

FIG. 15 is an exemplary illustration of a cloud assets interface, according to an embodiment of the present invention.

DETAILED DESCRIPTION

Figure 1:
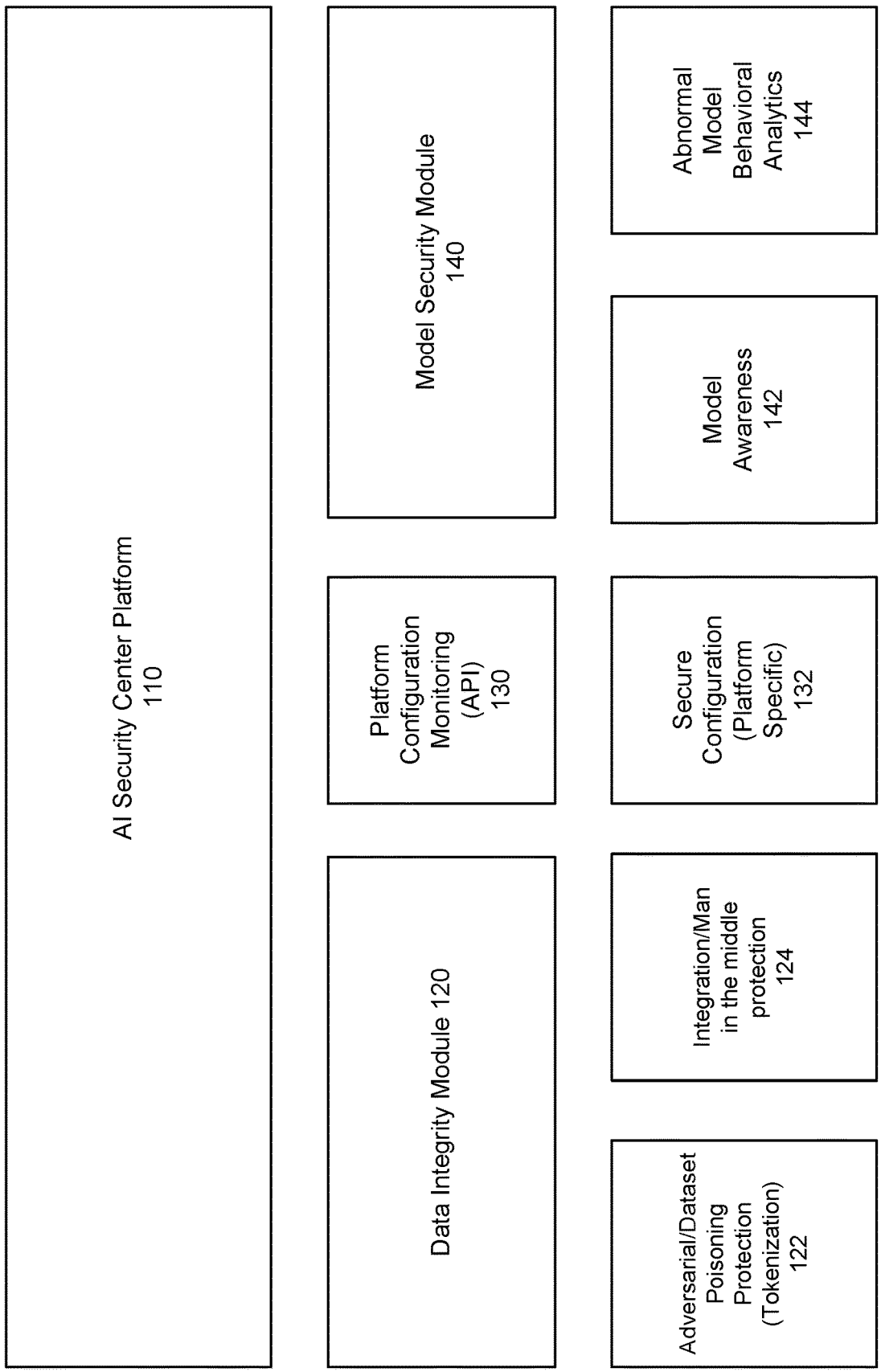
FIG. 1 is an exemplary architecture diagram, according to an embodiment of the present invention.

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to securing artificial intelligence (AI)/machine learning (ML) models while keeping the configuration and implementation simple and streamlined. An embodiment of the present invention is directed to delivering visibility on AI models across an entire organization as well as other corporate structures.

The implementation of AI and ML models into every business process is accelerating. These systems integrate data from multiple sources and utilize learning algorithms that are generally of unknown descent. This makes visibility, cyber security, and risk management difficult for an entity, e.g., chief information security officer (CISO) and other users, to ensure proper protection against AI specific risks.

According to an exemplary implementation, an AI Security Platform may include a SaaS application supporting AI/ML platforms to simplify and streamline security, risk management, and monitoring of key AI security controls. The AI Security Platform combines the power to understand and reduce the security risk of using AI/ML technology in a streamlined manner.

With an embodiment of the present invention, the AI Security Platform enables visibility into key security threats and monitors such threats for leading AI/ML engines from various providers, e.g., Microsoft, Google, IBM, KPMG, Amazon, etc. Other platform supports may be based on client demand, market opportunity and/or other considerations. Additional security, risk, and/or ethics controls may be added.

An embodiment of the present invention may support various users, industries and applications. Exemplary personas may include: CISO (Primary), AI Security Team (Primary), AI Engineering Team (Secondary), Application Security Team (Secondary), etc.

According to an exemplary illustration, a persona may include a CIO/CISO/director user in an organization. Regulations are moving at a fast space and this user may be tasked with securing data and systems and protecting the organization. In this example, the organization may seek to apply leading industry best practices to end-to-end AI processes, simplify the security of the AI system and better understand the impact of a breach or attack on an AI system. Expectations may include protecting against major threats and breaches, simplifying the process of securing AI, increasing visibility and transparency and meeting forthcoming regulatory compliance.

An embodiment of the present invention is directed to providing visibility into key security threats to AI/ML systems. This provides AI security awareness which means clients may be aware of security risks posed by AI components, including compromises to data, models, etc. An embodiment of the present invention facilitates integration and is easy to embed into existing ecosystems, e.g., working alongside a variety of AI/ML platforms. The innovative system promotes ethical AI/ML decision making so that clients are ensured their models are conforming to ethical and/or other standards. Accordingly, an embodiment of the present invention provides a standard way to review deployed models and their functions.

FIG. 1 is an exemplary architecture diagram, according to an embodiment of the present invention. AI Security Center Platform 110 may support various functions including Data Integrity Module 120, Platform Configuration Monitoring (API) 130 and Model Security Module 140.

An embodiment of the present invention is directed to obtaining insights into AI implementations and assisting clients to securely and confidently embed AI in core business functions. With the innovative system, users can monitor AI implementations, gain understanding when data is being attacked and further protect against various threat scenarios.

AI Security Center Platform 110 may create Adversarial AI security standards and associated frameworks. AI Security Center Platform 110 provides a single place to track platforms, models, and/or data sources. This may include AI Portfolio and threat/vulnerability tracking as well as manual and automated mapping. AI Security Center Platform 110 further provides analytics dashboard; key risk identification and prioritization; telemetry data collection and aggregation (related to core risks); analysis of telemetry across internal systems and against peers and user management.

According to an embodiment of the present invention, AI Security Center Platform 110 serves as a central administrative (SaaS) portal. AI Security Center Platform 110 aggregates individual capabilities of the solution, manages the client journey, provides dashboarding and reporting, and user management. AI Security Center Platform 110 may further provide an interactive user interface to various users, such as CISOs and AI Security teams. The interactive user interface generates a single consolidated view into adversarial security protection. The interactive user interface may further manage the client journey and aggregate the capabilities of the platform components to ensure data integrity, secure configuration, and model behavior.

Data Integrity Module 120 ensures that data is secure. Data Integrity Module 120 provides functionality that focuses on structured data models. This may be achieved by applying a core framework, extract transform and load (ETL) pipeline testing, standardized data set integrity and identifying when learning sets have been infected. Data Integrity Module 120 may provide various types of protection, including Adversarial/Dataset Poisoning Protection 122 and Integration/Man in the middle Protection 124.

Adversarial/Dataset Poisoning Protection 122 may leverage blueprints from IEEE, OpenAI, MITRE, etc. In addition, Adversarial/Dataset Poisoning Protection 122 may identify adversarial attack signals from peers as well as other functionality, such as data tagging, tokenization and file security (e.g., PKL file security, etc.).

In addition, AI Security Center Platform 110 supports data integrity, through Data Integrity Module 120, that enables various users, such as CISOs and AI security professionals, to monitor the security of learning (and living) data sets in use by various key AI/ML learning systems. An embodiment of the present invention is directed to developing a capability to understand and protect against adversarial dataset poisoning attack (and man in the middle attacks) to ensure proper data security and integrity in the AI/ML architecture. This is represented by Adversarial/Dataset Poisoning Protection 122 and Integration/Man in the Middle Protection 124, as shown in FIG. 1. Currently, CISOs and AI security teams struggle with ensuring the integrity and security of both the AI learning sets and on-going data sets that AI/ML learning systems rely on to provide safe, reliable, and error free results. An embodiment of the present invention provides protection and visibility into data poisoning and other data centric attacks on AI/ML architectures that could create significant error and breach risk.

Platform Configuration Monitoring (API) 130 provides platform configuration monitoring. This may involve analyzing security configurations against vendor, industry, and best practices. Other features may include security baselining; configuration impact analysis; pre-production review; on-going monitoring; mechanisms to configure the platform and quarantine functionality. Platform Configuration Monitoring (API) 130 may further support secure configurations which may be platform specific, represented by 132.

Platform Configuration Monitoring (API) 130 may analyze various models and generate a baseline to ensure that systems identified and tracked are aligned with the baseline. For example, Platform Configuration Monitoring (API) 130 may analyze how a system is configured and compare a current configuration to best practices or standards.

AI Security Center Platform 110 supports secure configuration, as shown by 132, that provides an ability to map and monitor AI/ML platform and model configuration against secure configuration standards to determine whether the model is sufficiently secured from adversarial risks. An embodiment of the present invention provides visibility and monitoring of configuration settings to ensure AI/ML platforms are securely configured. With current systems, CISOs and AI security professionals often lack an ability to get visibility into the configuration of the platforms supporting AI/ML integration. This creates a significant security hole that if exploited could expose the systems to serious adversarial, data, and privacy risks. An embodiment of the present invention enables users to understand and monitor the security posture against manufacturer best practice and guidance to reduce security risks.

Secure Configuration 132 may determine whether a system is securely configured by ensuring that an AI platform has privacy configurations that are compliant with various standards (e.g., vendor standards, industry standards, best practices, etc.). Secure Configuration 132 may also perform security baselining. For example, an embodiment of the present invention may determine whether a system conforms to security standards and if not, how to remediate or bring the system up to the proper standards. This may be performed across multiple platforms.

Model Security Module 140 may include Model Awareness 142 and Abnormal Model Behavior Analytics 144. In addition, Model Security Module 140 may use MITRE (or other framework, curated knowledge base and model) as a guide and provide an ability to continuously test the models (e.g., 24/7) and support inference risk (e.g., data and results are as intended).

For example, Model Security Module 140 may enable users to understand how models are performing from a security perspective. An embodiment of the present invention is directed to determining whether a hacker has altered a model.

AI Security Center Platform 110 supports Behavioral Monitoring and Analytics, through Model Security Module 140, that applies techniques to identify, understand, and monitor adversarial threats to the ML/Systems and Models through Model Awareness 142 and Abnormal Model Behavior Analytics 144. Abnormal Model Behavioral Analytics 144 may support AI models for security and further test systems using SQL/chaos models.

An embodiment of the present invention provides visibility and monitoring that reduces the cyber risk of AI/ML learning models integrated into core business processes that might be under attack. Models that have been tampered with could pose fundamental risks to patient health, financial decision, and create significant long term disruptions. As these systems are often "black boxes," errors may or may not be identified or managed appropriately for an extended period of time. These systems are generally looking to remove the people out of the process that would otherwise be a "check" to the process outcome. An embodiment of the present invention seeks to reduce the cyber risk of anomalous AI model behavior based on adversarial AI threats.

An embodiment of the present invention provides visibility into an AI pipeline from a security perspective. The innovative system provides automated mapping of AI platforms, models and data sources. In addition, telemetry data may be gathered and further analyzed. An embodiment of the present invention supports developing standards and associated frameworks.

According to an embodiment of the present invention, an automated mapping model may identify certain signatures and based on the signatures, map and identify AI systems. This may involve identifying calls made to external data sources. For example, an embodiment of the present invention may infer how a system is handling training data and also determine the type of model that is being applied.

An embodiment of the present invention is directed to collecting telemetry data to provide visibility across various AI pipelines inside an organization. This may also be performed across multiple clients, platforms, entities, industries, etc. An embodiment of the present invention may be extended to determine various metrics across one or more entities. For example, an embodiment of the present invention may determine the highest attack rate in a particular domain or application, e.g., clinical trials, pharmaceuticals, etc. For any determination, an embodiment of the present invention may provide actions to remedy and/or better protect AI/ML implementations.

An embodiment of the present invention is directed to providing real-time visibility into an AI pipeline to accurately identify attacks, potential attacks and provide better protection against current and future attacks. An embodiment of the present invention may identify potential indicators of exposure on data poisoning, for example. This provides insights and improves trust in an entity's AI platform.

An embodiment of the present invention may support various user experience, including mobile device, virtual or augmented reality, etc.

Figure 2:
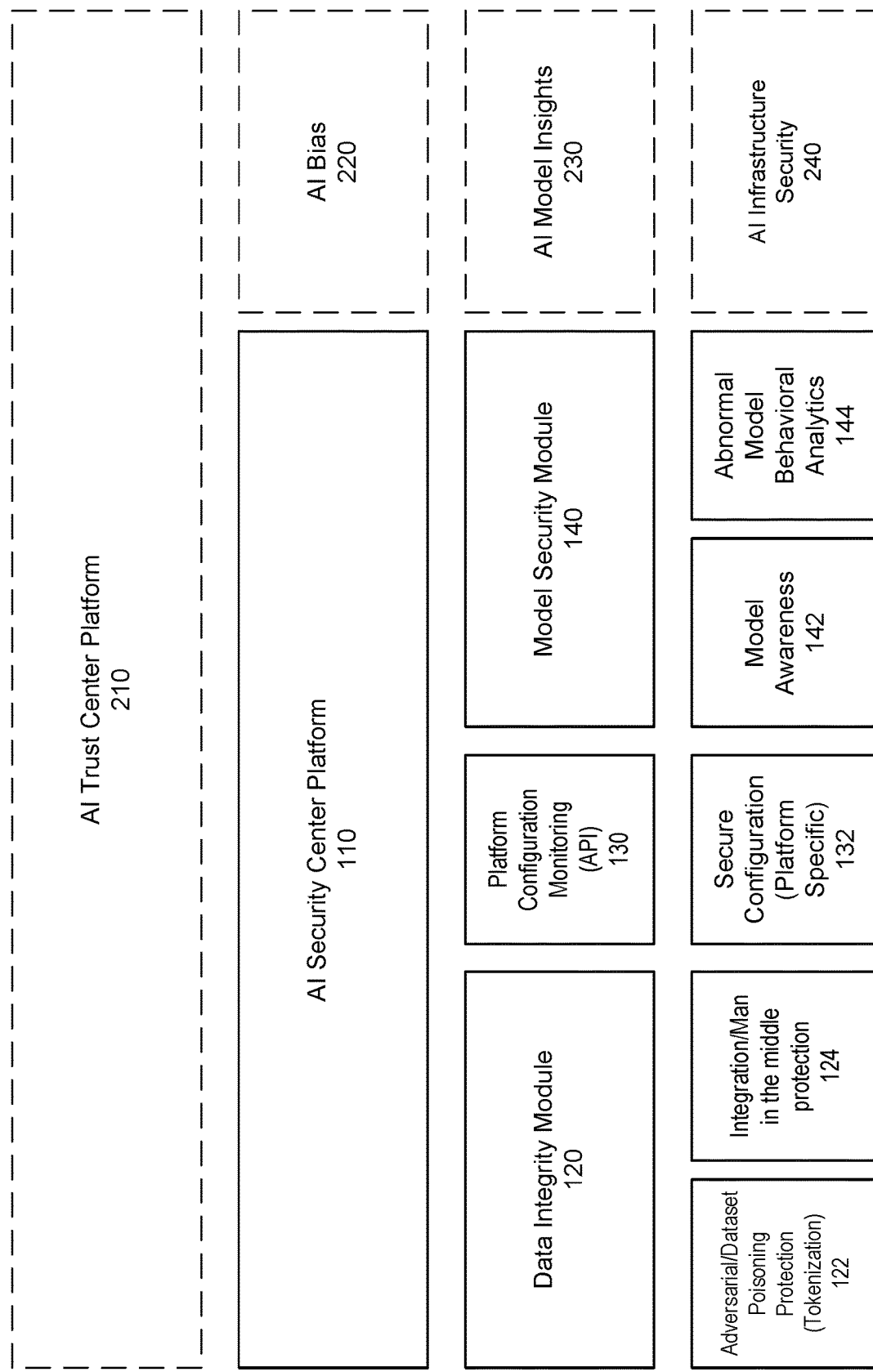
FIG. 2 is an exemplary architecture diagram, according to an embodiment of the present invention.

FIG. 2 is an exemplary architecture diagram, according to an embodiment of the present invention. FIG. 2 provides one exemplary illustration; other variations in implementation and design may be realized. As shown in FIG. 2, additional functionality may be provided by AI Trust Center Platform 210, AI Bias 220, AI Model Insights 230 and AI Infrastructure Security 240.

FIG. 2 illustrates an exemplary system that integrates components to create trust in implementing a model in core business processes. The system of FIG. 2 provides model insights, e.g., has the model been tested against other standards from different countries, etc.

AI Trust Center Platform 210 integrates elements of cyber and model management, model insight, model behavior, model bias, etc.

An embodiment of the present invention is directed to developing a trusted, centralized and integrated AI security dashboard SaaS platform that provides visibility into the overall health of a company's AI pipelines.

An embodiment of the present invention is directed to delivering simplified AI security management by mapping AI pipelines, monitoring AI systems for key threats, and helping organizations respond to AI system impacts such as data loss, threats in AI, etc. Through a holistic overview of a company's AI/ML health, an embodiment of the present invention protects systems both on-premises and in the cloud, offering a solution to a deficiency in the cybersecurity marketplace. Through dashboard alerting and trend analysis, an embodiment of the present invention provides triage support for suspicious events and pursues them to remediation.

Various benefits may include: transparency around AI/ML threats; visibility into threats as well as team involvement; simplified view into the ecosystem of AI and ML models, allowing for those without a data science background to understand the security risks posed by the models; SaaS model that enables quick deployment; and improved efficiency and time/cost savings.

An embodiment of the present invention is directed to a self-service easy-to-integrate platform which monitors AI systems at various points in an AI building lifecycle to provide alerts to a range of suspicious activities, threats, etc. This may include: static analysis, training data and features monitoring, model accuracy drifts, model file versioning and drift analysis and runtime analysis of outputs produced using these systems.

An embodiment of the present invention is directed to Cross-Platform AI Pipeline Discovery. Utilizing a collector-based architecture, an embodiment of the present invention integrates with APIs and webhooks across multiple external AI development and delivery platforms to gather metadata about assets that may be used for development and delivery of AI pipelines.

Gathered metadata may relate to asset types, activity, data sources, models, experiments, jobs and notebooks, endpoints and deployments. Metadata about asset types may include: datasets, models, experiments, jobs, notebooks, endpoints, and deployments. Metadata about activity may include: versioning, activity types, activity dates, and user/system context. Metadata about data sources may include: format, storage, size, sourcing, artifact locations, and features. Metadata about models may include: performance metrics, supporting libraries and frameworks, sourcing, and artifact locations. Metadata about experiments, jobs, and notebooks may include: compute context, run history, execution times, inputs/outputs, and artifact locations. Metadata about endpoints and deployments may include: compute context, supporting libraries and frameworks, authentication context, and artifact locations.

Metadata may be used to create and/or maintain asset records inside a Core Platform, which may be made available as part of the pipeline management process. Pipelines may be built by linking assets and users, manually and through automated relationship mapping, to form a unified context around the linked assets, across the various platforms from which the assets originated.

An embodiment of the present invention is directed to Pipeline Lineage Discovery. Utilizing asset metadata from external AI development and delivery platforms, an embodiment of the present invention is directed to analyzing available information to discover relationships between assets, from which asset lineage may be constructed. The final constructed lineage may form a graph from which ancestors and descendants of any given asset may be retrieved. The inference of relationships between assets may utilize readily-available relational data from the external AI development and delivery platforms, as well as analytical data gathered from other sources including code references, tokenization, and/or identifying attributes to build an asset signature which may be used for lineage discovery. Lineage combinations enable concentration and relevance-related context for discovery of pipeline-specific lineage.

An embodiment of the present invention is directed to an Adversarial Detection Engine. With an embodiment of the present invention, the process of detecting security findings, incidents, and alerts may be driven by a workflow that coordinates the execution of analysis and evaluation of both events and related assets between external AI development and delivery platforms, a Collector Agent, and a Core Platform.

An embodiment of the present invention is directed to developing and applying a Behavioral Model for Inside Threat Detection. According to an embodiment of the present invention, activities logged against individual users within external AI development and delivery platforms may be analyzed against pipeline context for pipeline users and associated responsibilities provided during pipeline creation. The validity of the activities from an authorization perspective may be evaluated against a set of assigned responsibilities in combination with regression and classification-based modelling, which collectively form a pattern-matching system built off of historical time-series data for user interactions to evaluate the likelihood of insider threats.

An embodiment of the present invention is directed to Analysis for Detection of Adversarial AI Threats. According to an embodiment of the present invention, decision trees and parallel execution may be designed for the use of multiple detection methods in the identification of adversarial AI threats. Each individual analysis execution may provide an intermediate result that, when combined together, may be used to determine the presence of one or more adversarial AI threats to a higher degree of accuracy than any individual result.

An embodiment of the present invention is directed to AI Pipeline Collector Agent. According to an embodiment of the present invention, a collector agent, built to run inside multiple cloud and on-prem environments, may be used to achieve integration with external AI development and deployment platforms, asset discovery, event monitoring, analysis execution, and adversarial threat detection for the purposes of delivering AI security-related outputs. The collector agent may be architected for deployment flexibility, security of both agent components and data, and scalability to handle big data processing requirements. The collector agent may be capable of self-updating its threat library to dynamically manage detection capabilities as new threats are discovered and new detections are created. The integration system is pluggable, so that integrations may be enabled, disabled, created, and/or destroyed via remote commands without requiring direct intervention in the infrastructure.

An embodiment of the present invention is directed to Framework-Agnostic AI Pipeline Analysis. According to an embodiment of the present invention, context-aware framework detection capabilities may be used to unify analysis execution. Detection may be performed using pattern matching against asset artifacts and metadata to infer relevant frameworks and capabilities. The detected frameworks and capabilities may be verified or overridden within the Core Platform as part of pipeline asset management. The final set of frameworks and capabilities may then be provided to the analysis execution process to recreate the asset in a representation that abstracts framework and data-specific attributes to provide unified processing of analysis.

An embodiment of the present invention is directed to an AI Card that enables evidence collection for the creation of compliance, security, and brand-related representations of AI systems. An AI Card may include: one or more pipelines, governance information, and/or specific compliance evidence for an entire AI system. The compliance evidence for a given AI Card may be specified by the card template applied, which includes the sections and fields necessary to demonstrate compliance against the field definitions. Fields may include: free text, date, numeric, checkbox, single/multiple choice, and/or optional file upload attachments. Default field values may be auto-populated by formulas built using data from the inventory and monitoring data already collected by the Core Platform. Cards may be shareable within the platform to other users, to regulatory bodies, to file exports such as PDF, to third-party platforms, marketplaces, and exchanges, to external auditors, and to websites via html embedding. Versioning, change management, and sharing history for AI cards may be stored in the platform for compliance and governance purposes. AI Card templates may be modified, cloned, and/or created from scratch via a form builder with specific support for formula-based auto-population building off data collected in the Core Platform.

An embodiment of the present invention is directed to a SaaS solution that continuously monitors a company's AI systems and assets to detect potential threats from adversarial attacks, provides security scoring and enables teams to gain visibility into an overall health of a company's AI. An embodiment of the present invention integrates with a company's existing security tooling and AI pipelines to provide visibility into the overall health of a company's AI systems through continuously scanning and monitoring of AI assets and pipelines for vulnerabilities related to model performance and health. An embodiment of the present invention further provides security recommendations based on confidence of exposed assets. For example, a collector utility may be installed and deployed in an environment where AI models are being developed and deployed. The collector utility may connect into the system where development is being performed. This enables data to be easily pulled and aggregated from various systems where a predetermined set of tests may be applied against those pipelines.

Various user capabilities may include: loading asset information related to ML systems into an environment; categorizing assets broadly according to stage(s) of lifecycle; viewing data sets (e.g., raw data, training data used for model training, etc.); viewing experiments; viewing models in development and models deployed into production environment (e.g., containers, dependencies, distributions for inputs and outputs, etc.); and viewing orphaned assets (e.g., status, change over time, etc.).

An embodiment of the present invention is directed to implementing a Zero-Day AI Threat Engine. Anonymized data and telemetry across the monitoring data collected in the Core Platform may be analyzed using unsupervised learning models to provide information about trends, potential threats, etc. The trend and threat information gathered may be used to create zero-day findings in an administrative platform to be distributed to customer segments based on relevance and presence of threat factors. Zero-day findings may represent unique, potentially novel attacks against AI systems or against industry segments that cannot otherwise be detected outside of the aggregated data gathered and analyzed by the unsupervised learning systems that support the trend and threat discovery.

An embodiment of the present invention is directed to Automated Detection of Adversarial Synthetic Data Augmentation. The use of data augmentation, generative AI, and publicly-sourced data may be tracked as part of the provenance and lineage metadata gathered by the collector in order to initiate a detection workflow to identify adversarial synthetic data. This detection technique may combine data provenance-based defense with batch clustering to identify inconsistencies in augmented data that may indicate poisoning of the synthetic or publicly-sourced data, wherein each batch may be analyzed for elements including statistical characteristics, cross-entropy, and clustering within an unsupervised learning model, which are then aggregated and fed into a supervised model built to detect anomalies across batches.

Figure 3:
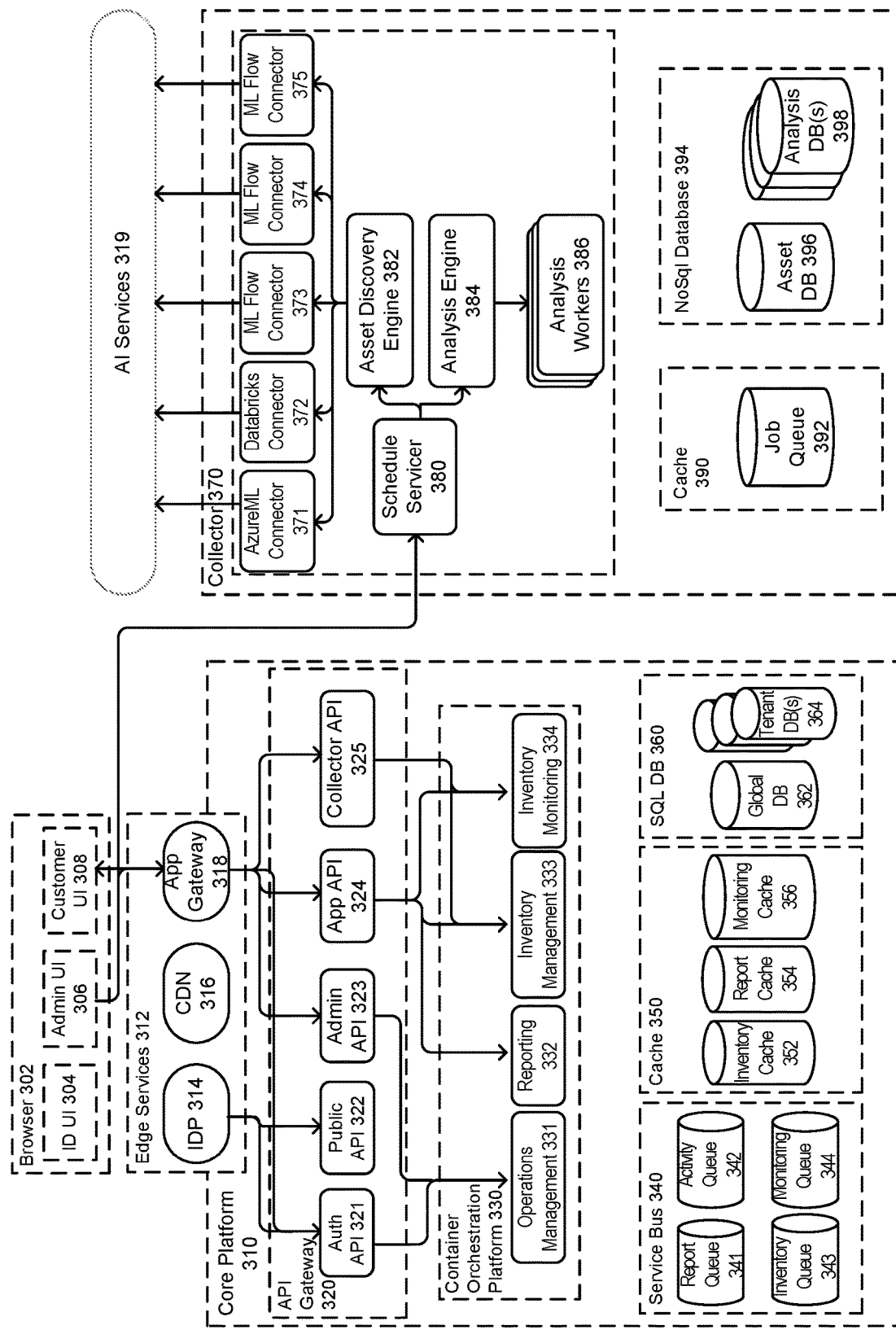
FIG. 3 is an exemplary application architecture, according to an embodiment of the present invention.

FIG. 3 is an exemplary application architecture, according to an embodiment of the present invention. Core Platform 310 may include Edge Services 312 that interact with Browser 302. Browser 302 may execute on various devices, including computer servers, client systems, mobile devices, smart devices, etc. Browser 302 may include: Identity (ID) User Interface (UI) 304, Administration UI 306 and Customer UI 308. Edge Services 312 may include: Identity Provider (IDP) 314, Content Delivery Network (CDN) 316 and Application Gateway 318.

Core Platform 310 may include API Gateway 320, Container Orchestration Platform 330, Service Bus 340, Cache 350 and Databases, such as SQL DB 360.

API Gateway 320 may include Authentication API 321, Public API 322, Administration API 323, Application API 324 and Collector API 325.

Container Orchestration Platform 330 may include: Operations Management 331, Reporting 332, Inventory Management 333 and Inventory Monitoring 334.

Operations Management 331 may include a settings interface that provides effective security management by offering control over user management, integrations, scoring, and/or platform customization. User management ensures proper access and permissions, where integrations may be crucial to connect to an organization's existing environments, score configurations to allow for tailored security score assessments, and support platform customizations that satisfy unique security needs. User and role management may control access to sensitive information, enforcing role-based access controls and tracking user activity.

Scoring configuration allows customization of incident, alert and security finding scoring, criticality levels and scoring ranges to match an organization's evolving security goals. This enables prioritization and response to incidents in line with the organization's needs, improving security posture and effective management.

Reporting 332 provides high-level insights into program health, assets and/or pipelines as well as monitoring through charts/graphics, metrics, and critical details. Reports may be designed to provide quick, comprehensive information for managers, directors, and executives, who do not need the in-depth details. Various platform users have access to these reports.

Health may be represented by various scores and metrics, including: security score (e.g., measure security posture); model/dataset security score (e.g., security score across various pipeline models and datasets); asset breakdown (e.g., total count and breakdown of assets); pipeline, model, dataset breakdown (e.g., total count of pipelines/models/datasets and breakdown of corresponding health statuses); organization pipeline (e.g., comprehensive overview of security status of different components of an organization's overall pipeline); etc. Lifecyle may be represented by pipeline and model states (e.g., proportion of pipelines in training, pre-production, and production stages); dataset breakdown (e.g., proportion of internal and external datasets); orphaned assets (e.g., unsecured assets that are not currently being monitored or managed by a pipeline); and resilience recommendations (e.g., actionable insights to enhance the security posture of an organization). Security may be represented by security trend (e.g., chart of number of incidents and alerts over a time period); incident breakdown (e.g., high, moderate and low severity); alert breakdown (e.g., high, moderate and low priority) and top incidents (e.g., incidents sorted by severity).

Inventory Management 333 may relate to management of assets and pipelines. Inventory Management 333 may manage and track multiple types of assets within AI development pipelines. These assets may include datasets, models, experiments, and deployments. They may be considered to be crucial components in the development and deployment of AI models and further monitored and managed throughout their lifecycle to ensure security and performance.

Asset types may include: Dataset; Models; Experiment and Deployment. Other asset types may be supported.

Dataset may represent collections of data that are used to train and evaluate models for their accuracy and performance. According to an embodiment of the present invention, supported dataset types may include: tabular, image, text, etc.

Models may represent data organization and standardization techniques to recognize patterns in the data. They may be trained on datasets and may be re-trained with feedback and/or new data to improve their performance. Various model frameworks, including automated machine learning platforms, may be supported. Various model objectives may be supported including regression, classification, etc.

Regression may represent a statistical analysis technique used to model and analyze the relationship between a dependent variable and one or more independent variables. Target metrics may include: normalized RMS error; Spearman correlation; R2 score and normalized mean absolute error. Classification may represent a machine learning task that involves assigning data points to predefined categories or classes based on some features or attributes. For example, a goal may be to train a model to accurately predict the class label for new unseen data points. Target metrics may include: accuracy, precision, recall, F-Score (F1), ROC/AUC, etc.

Experiment may refer to the process of conducting tests and analyzing results to build, train, and evaluate machine learning models. An experiment may represent a single machine learning task, which may include multiple steps including data preparation, model selection, training, and evaluation.

Deployment may refer to a process of taking a trained machine learning model and putting it into production, making it accessible to users for real-world applications. This may involve taking the trained model, packaging it with necessary dependencies, and deploying it to a target environment.

According to an embodiment of the present invention, a pipeline may encompass various assets and stages in a journey from training to deployment of an AI model. When creating a pipeline, an organization may provide identifying contextual information, such as business criticality, and business context to allow for understand of higher risk areas. Pipelines may also contain a list of associated assets (e.g., datasets, models, experiments, and deployments) and team members with their assigned pipeline roles.

Within an embodiment of the present invention, security scores may calculated by individual assets, individual pipelines, and multiple pipelines. From a pipeline perspective, a security score may be calculated from the assets that are included in that pipeline. Any alerts or incidents that are generated may be linked directly to individual pipelines, dependent on the criticality of each pipeline. For example, a pipeline that includes the same assets as another pipeline may have different alerts or incidents if it has a high criticality as opposed to a low criticality.

An embodiment of the present invention is directed to determining security scores that measure a security posture of an organization or a single pipeline. A security score algorithm may be based on multiple factors, including vulnerabilities in AI pipelines, incidents, surface area, etc. Scores may be applied in various scales, e.g., 0-1 scale, 0-100 scale, etc., where a score of 0 represents every asset has a high severity and high confidence incident while a score of 1 or 100 represents no incidents, alerts and security findings across all assets. Security scores may be calculated by combining impacts from Incidents, Alerts, and/or Security Findings. Pipelines may have a defined Criticality, where a higher criticality relates to greater impact from Incidents, Alerts, Security Findings.

Security scores may be applied in various ways including: an entire organization by combining scores for all pipelines; each individual pipeline by combining scores for all assets included in the pipeline; the organization's models by combining scores for all models included in the pipelines; the organization's datasets by combining scores for all datasets included in all the pipelines; each individual pipeline's models by combining scores for all models included in all pipelines; and each individual pipeline's datasets by combining scores for all datasets include in all pipelines.

An embodiment of the present invention is directed to creating new pipelines to address specific business needs. The process may involve providing context details, defining desired outcomes and determining necessary inputs, tools and resources.

An embodiment of the present invention is directed to configuring and/or updating pipeline details to enable users to modify existing pipeline information, such as reassigning a pipeline to a new project, adjusting business criticality post security review, and/or managing the team members associated with the pipeline.

An embodiment of the present invention is directed to managing assets for pipelines which is key for keeping the assets updated and effective. This enables users to modify assets, e.g., selecting new models, incorporating new datasets for model retraining, etc.

Inventory Monitoring 334 may relate to monitoring events, incidents, alerts, and security findings. Inventory Monitoring 334 may represent a toolkit for continuous security information gathering and analysis to provide real-time visibility into security events, detect threats and anomalies, and furnish users with relevant information for quick decisions. An embodiment of the present invention may serve as an early warning system, allowing organizations to detect and respond to security incidents before they escalate, thereby proactively managing security posture and reducing the risk of data loss or theft.

Events may refer to any change that occurs in a source system and serves as a trigger for a monitoring process. Examples of events may include: dataset created; experiment run failed; model updated new version added; deployment deleted, etc.

Events may capture key changes in an organization's security posture. Events may form the basis for threat detection, response, and analysis. An embodiment of the present invention may use continuous event monitoring to detect security threats and provide critical information for quick, informed decisions. Events may be significant as they provide real-time, accurate, and actionable security information. An embodiment of the present invention may aggregate and analyze events to offer a comprehensive security view and enable users to promptly respond to threats. In essence, events play a crucial role in monitoring and response processes by providing the necessary information to detect, assess, and respond to security incidents, ensuring the protection of critical assets.

Incidents may refer to a security event that has a significant impact on an organization and further requires a response and recovery effort. In addition, Incidents may be generated by automatic trigger of alert rules as well as manual initiation following investigation of an alert. For example, Incidents may include: severity and confidence ratings; reported on date; incident status; team members associated with it; reason why the incident was generated; assets associated with it; recommended next steps; activity log; etc.

Incident details may provide users with an in-depth look into a specific incident. This feature allows users to access comprehensive information about the incident, including its description, related activity, and recommended next steps for resolving the issue. This level of detail may be useful for understanding the full context of the incident, enabling users to make informed decisions and take appropriate actions to address the issue.

Alerts may represent a technical notification regarding current security risks, such as vulnerabilities and exploits. Alerts may provide early warning signals indicating a potential change or activity that may warrant further investigation and attention. Alerts may include: priority and confidence ratings; detected on date; alert status; associated team members; reason why the alert was triggered; associated assets; recommended next steps; activity log; etc.

In addition, Alerts may represent notifications generated by the Core Platform in response to specific security incidents or conditions. Alerts may be considered important because they provide real-time visibility into potential security risks and allow users to take proactive measures to address them before they escalate. Alerts may be triggered by various factors, such as changes in system activity or user behavior. A goal of alerts may be to keep users informed of the latest security events and to provide the necessary information to respond effectively. They further minimize the impact of security incidents and improve the overall security posture of an organization by providing timely and relevant information to security teams.

Security Findings may represent a gap or flaw in an information system, security procedures, controls, and/or implementation that may be taken advantage of or activated by a potential threat. These are primarily identified using a static analysis method. Security findings may include: security rating; security finding status; description; recommended next steps; list of affected assets; etc.

Security Findings details provide users with an in-depth look into a specific security finding. This feature allows users to access comprehensive information about the security finding, including its description, related activity, and recommended next steps for resolving the issue. This level of detail may be useful in understanding the full context of the security finding, enabling users to make informed decisions and take appropriate actions to address the issue. Security Findings details may include: severity (e.g., potential risk of the security finding if not attended to); status (e.g., current activity for the incident such as paused and running); description (e.g., why the incident was created); recommended next steps (e.g., remediation steps); and assets related to the security incident. For example, by having a clear understanding of the assets impacted, users may take appropriate action to remediate the issue, such as applying patches or updates, reconfiguring the assets or implementing new security measures. This information may also be used to track the progress of the resolution efforts and ensure that impacted assets are secured in a timely manner.

An exemplary monitoring workflow may start with an event trigger, a change in the source system, which initiates a series of monitoring stages to evaluate the situation and determine any further updates or actions that need to be taken. This may include the creation of a new alert or incident and can result in a recalculation of security scores for all affected assets and pipelines.

Service Bus 340 may include various queues, such as Report Queue 341, Activity Queue 342, Inventory Queue 343 and Monitoring Queue 344.

Cache 350 may include Inventory Cache 352, Report Cache 354 and Monitoring Cache 356.

SQL DB 360 may include Global Database 362 and Tenant Database(s) 364.

Collector 370 may interface with various AI Services 319, via connectors, such as Azure ML Connector 371, Databricks Connector 372 and ML Flow Connectors 373, 374 and 375. Browser 302, via Admin UI 306, may communicate with Schedule Servicer 380 which interfaces with Asset Discovery Engine 382 and Analysis Engine 384 which supports Analysis Workers 386. Collector 370 may also include Cache 390, which supports Job Queue 392, and No SQL Database 394, which supports Asset Database 396 and Analysis Database 398.

Collector 370 may establish a web socket connection to a security center and pull information since the last time it ran (e.g., pipeline/asset mappings). For example, Collector may start log analytics engine and access logs since the last time it ran. In addition, Collector may start Asset Discovery Engine and view assets changed since the last time it ran. Collector may add log and asset information to a local data store. Further, Collector may initiate an Adversarial Analytics Engine and check for matches on newly added data. Collector may then push information (e.g., log events, new assets, analytics results, etc.) to Core Platform 310.

Asset Discovery Engine 382 may retrieve asset details for assets within an asset hierarchy. Asset details may include asset identifier, asset name, asset type, sibling relations, parent relations, etc.

Analysis Engine 384 may run an event analysis process for a new event. Event analysis may be executed for an asset or pipeline that includes the related asset. Analysis may be segmented based on criteria of an event and related asset so that only relevant analysis may be executed for each event. Event criteria may include: type of event (e.g., asset event, pipeline event, etc.); related asset information (e.g., type of asset, whether asset is part of pipeline, etc.); pipeline information (e.g., dataset, model, experiment, deployment, etc.); related asset context for the pipeline (e.g., dataset, model, etc.). Analysis Engine 384 may be executed in priority order so that earlier analysis results are available for later analysis. In addition, Analysis Engine 384 may receive the event as an input, and load values as necessary.

Analysis Engine 384 may perform evaluation and detection functions. For example, an alert rule may be executed once per pipeline that includes the related asset. Evaluation may be executed based on criteria specified in each alert rule so that relevant rules may be executed for each event. Alert criteria may include: type of event, asset event, related pipeline information, etc. Evaluation criteria for each type of asset or event may be executed for each asset/user in each matching pipeline. Collector evaluation may receive the event as input, along with the identifier of the specific asset being evaluated, and the evaluation criteria definition for the relevant evaluation clause. Collector may load values as needed. Detection capabilities may be executed in context of pipeline against which the alert is generated. When a new alert or incident is generated, a score recalculation may occur for all assets included in the evaluation, all pipelines that include those assets and the overall security score. Alert rules may be evaluated based on events that occur in the collector.

FIG. 3 may support various implementations, applications and uses cases. For example, uses cases may include: Data Poisoning, Configuration Vulnerabilities and Inference Attacks. Data Poisoning may involve public or internal data sets having been tampered. This may be more impactful if done on raw data sets thereby causing downstream effects. Configuration Vulnerabilities may include vulnerabilities that allow unauthorized access to a company's IP, which may be similar to traditional cyber-attacks. Inference Attacks may involve situations where bad actors strategically pings app in order to extract or replicate model; unusual activity on the production side of the AI pipeline.

Figure 4:
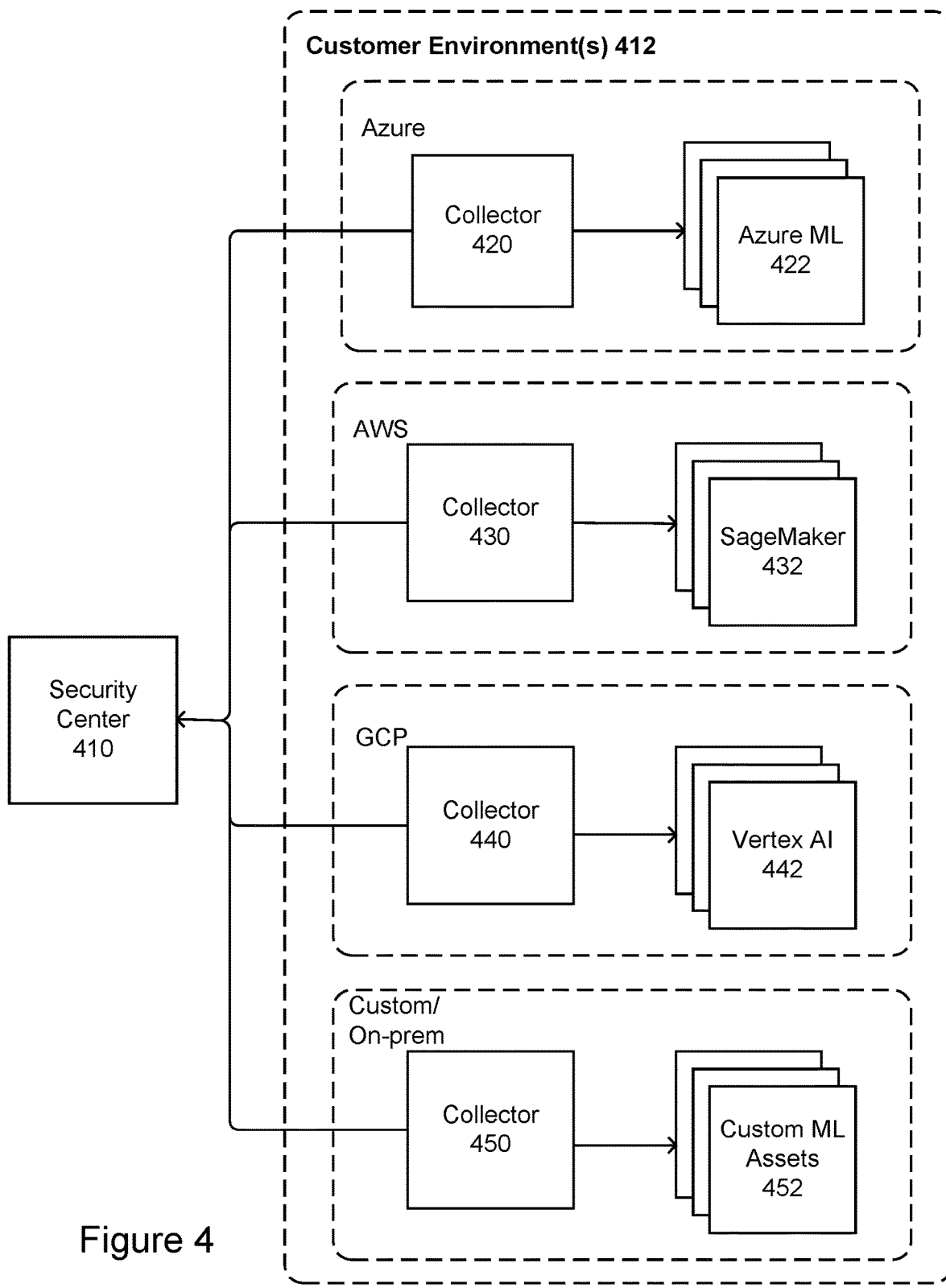
FIG. 4 is a collector architecture, according to an embodiment of the present invention.

FIG. 4 is a collector architecture, according to an embodiment of the present invention. Security Center 410 may receive data from various sources and systems as represented by Customer Environment(s) 412. Customer Environment(s) 412 may support multiple machine learning services, machine learning platforms, etc. In this example, Collector 420 may interface with a cloud service for accelerating and managing machine learning project lifecycles, such as Azure ML 422; Collector 430 may interface with a cloud machine learning platform, such as SageMaker 432; Collector 440 may interface with a machine learning platform, such as Vertex AI 442 and Collector 450 may interface with Custom ML Assets 452 in a custom/on-premise environment. Other external and internal systems may be supported across various different platforms, implementations and/or architectures.

Figure 5:
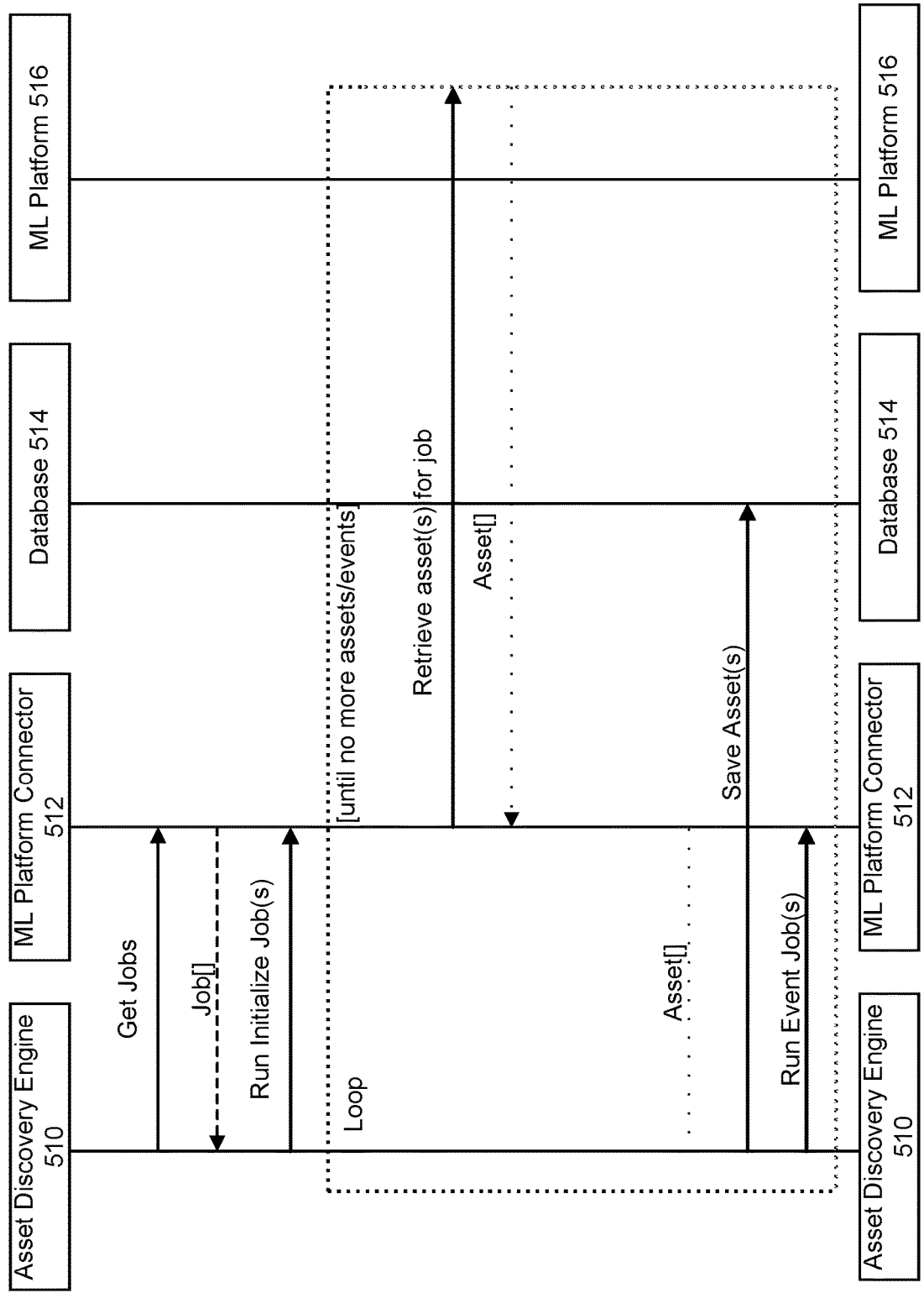
FIG. 5 illustrates an asset discovery process, according to an embodiment of the present invention.

FIG. 5 illustrates an asset discovery process, according to an embodiment of the present invention. FIG. 5 illustrates interactions between Asset Discovery Engine 510, ML Platform Connector 512, Database 514 and ML Platform 516. Asset Discovery Engine 510 initiates a Get Jobs process and ML Platform Connector 512 provides a response. Asset Discovery Engine 510 may then Run Initialize Job(s) until no more assets/events are found. ML Platform Connector 512 may then retrieve asset(s) for the job from ML Platform 516. Asset Discovery Engine 510 may then save assets to Database 514. Asset Discovery Engine 510 may then Run Event Jobs through ML Platform Connector 512.

Figure 6:
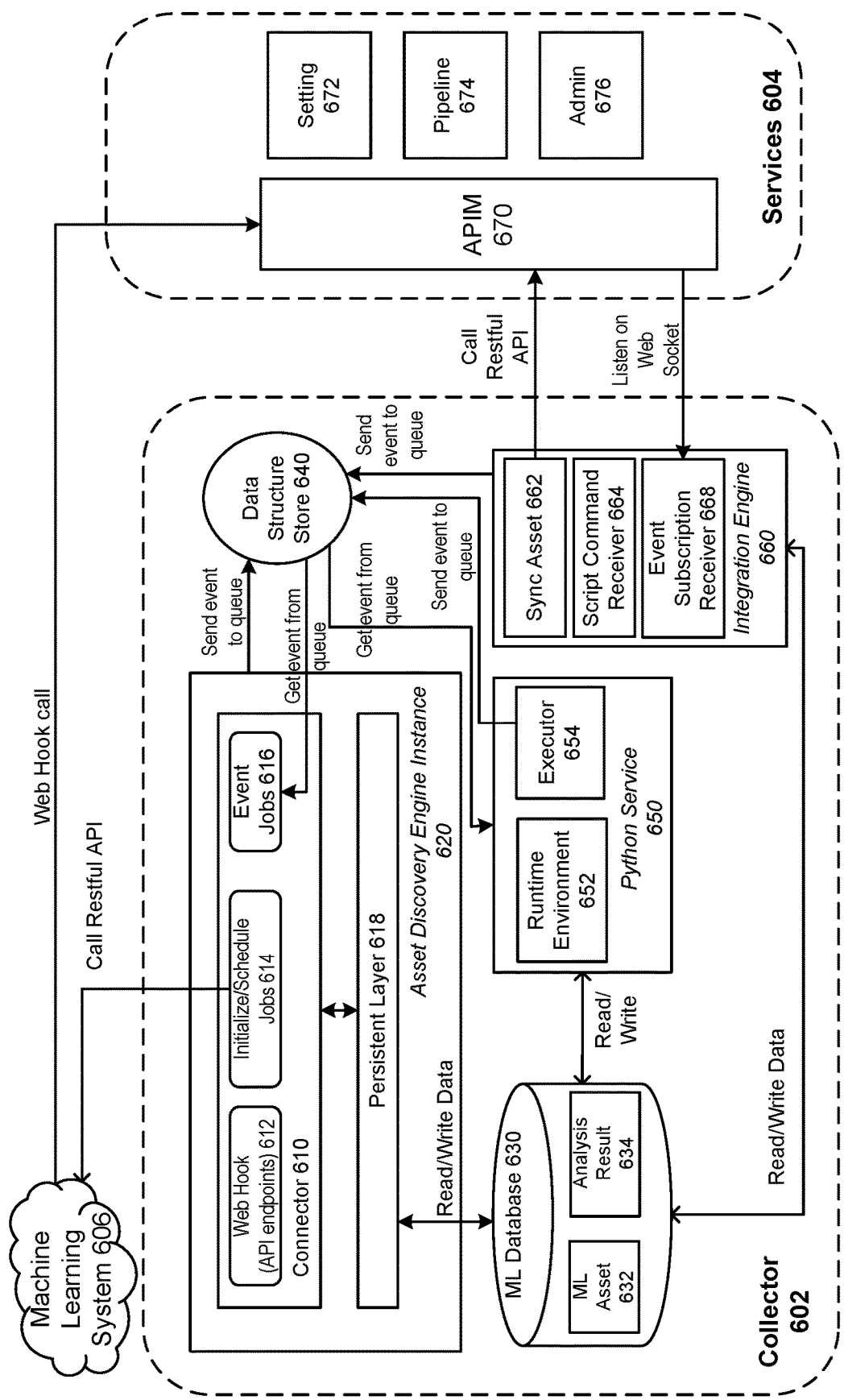
FIG. 6 is an exemplary collector data architecture, according to an embodiment of the present invention.

FIG. 6 is an exemplary collector data architecture, according to an embodiment of the present invention. FIG. 6 illustrates interactions between Collector 602, Services 604 and Machine Learning System 606. Collector 602 may include Asset Discovery Engine Instance 620, ML Database 630, Data Structure Store 640, Python Service 650 and Integration Service 660. Services 604 may include API Management (APIM) 670, Setting 672, Pipeline 674 and Admin 676. APIM 670 enables users to publish, secure, transform, maintain and monitor multiple APIs. APIM 670 may enable organizations to use existing back-end services to create complete API programs by creating consistent and modern API gateways.

Asset Discovery Engine Instance 620 may include Connector 610, which may support Web Hook (API endpoints) 612, Initialize/Schedule Jobs 614 and Event Jobs 616. Asset Discovery Engine Instance 620 may also include Persistent Layer 618 which interfaces with ML Database 630. ML Database 630 may store and manage data relating to ML Asset 632 and Analysis Result 634. Python Service 650 may read/write from ML Database 630. Python Service 650 may include Runtime Environment 652 and Executor 654. Data Structure Store 640 may perform actions, such as Get Event Queue and Send Event to Queue, against Event Jobs 616, Python Service 650 and Integration Engine 660.

Integration Engine 660 may support Sync Asset 662, Script Command Receiver 664 and Event Subscription Receiver 668. Integration Engine 660 may interact with Services 604, though APIM 670. Services 604 may include Setting 672, Pipeline 674 and Administration 676.

As shown in FIG. 6, Asset Discovery Engine Instance 620 may collect resource data from Machine Learning System 606 in multiple ways. Asset Discovery Engine Instance 620 may look up ML System resources and retrieve asset data through initialize jobs and schedule jobs, represented by 614. API endpoints implemented as web hooks, as shown by 612, may be called by Machine Learning System 606. Data may be immediately stored in queue in Data Structure Store 640 (e.g., Redis queue) to avoid overloading. Data (ML Asset 632) may be stored in ML Database 630.

An Analysis Engine may examine ML asset data, as shown by 632. The Analysis Engine may collect data from ML Database 630, analyze and store the data, as shown by 632. Integration Engine 660 may send Analysis Engine data to Services 604 through RESTful API and then listen to synchronize the configuration from Services 604 via web socket. Python Runtime Environment, as shown by 652, may represent an independent runtime Python environment for executing Python script dynamically, as shown by Executor 654.

Figure 7:
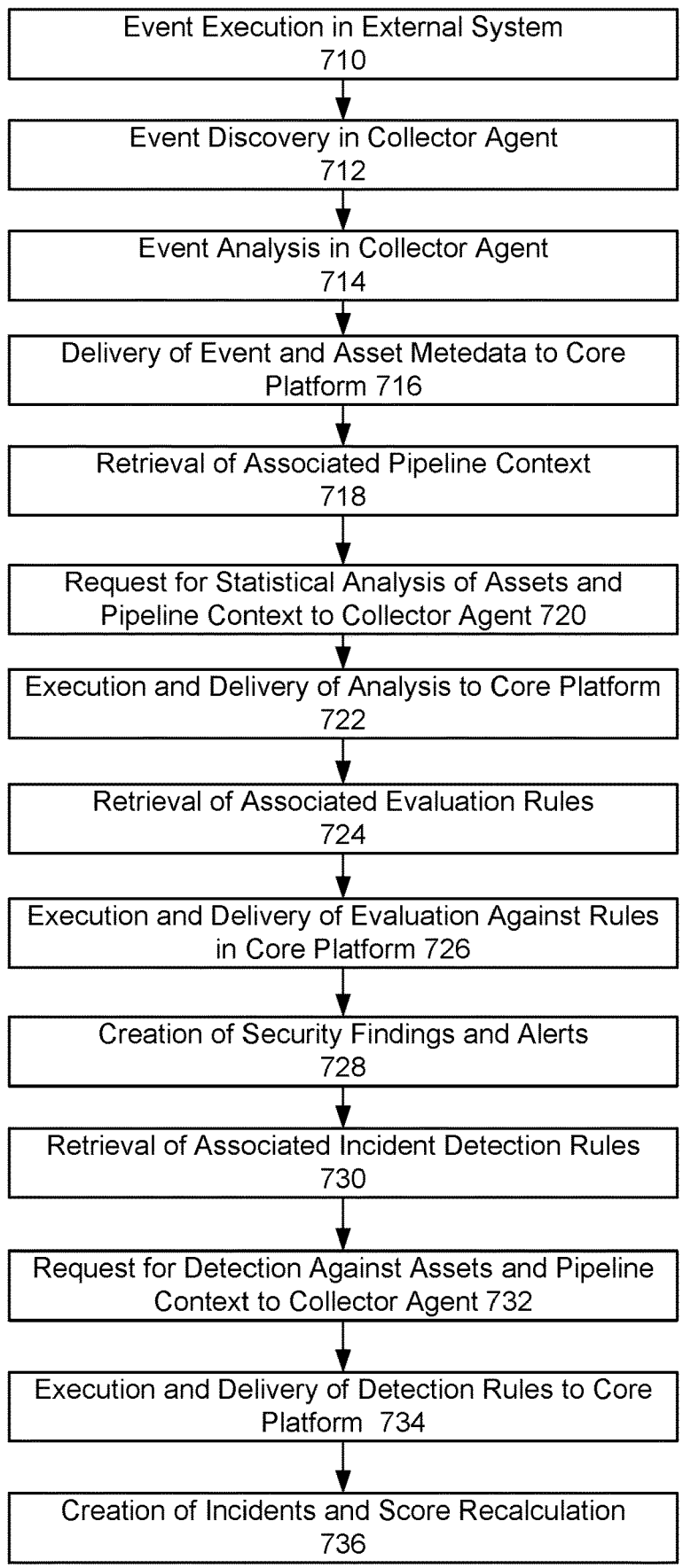
FIG. 7 is an exemplary flowchart for adversarial detection, according to an embodiment of the present invention.

FIG. 7 is an exemplary flowchart for adversarial detection, according to an embodiment of the present invention. FIG. 7 illustrates a process of detecting security findings, incidents and/or alerts. At step 710, event execution may occur in an external system. At step 712, event discovery may be performed in a collector agent. At step 714, event analysis may be performed in collector agent. At step 716, event and asset metadata may be delivered to a Core Platform. At step 718, associated pipeline context may be retrieved. At step 720, a request for statistical analysis of assets and pipeline context may be made to collector agent. At step 722, analysis may be executed and delivered to the Core Platform. At step 724, retrieval of associated evaluation rules may be performed. At step 726, an execution and delivery of evaluation against rules may be performed in the Core Platform. At step 728, security findings and alerts may be created. At step 730, associated incident detection rules may be retrieved. At step 732, request for detection against assets and pipeline context may be made to collector agent. At step 734, an execution and delivery of detection results may be made to the Core Platform. At step 736, creation of incidents and score recalculation may be performed. While the process of FIG. 7 illustrates certain steps performed in a particular order, it should be understood that the embodiments of the present invention may be practiced by adding one or more steps to the processes, omitting steps within the processes and/or altering the order in which one or more steps are performed.

Figure 8A:
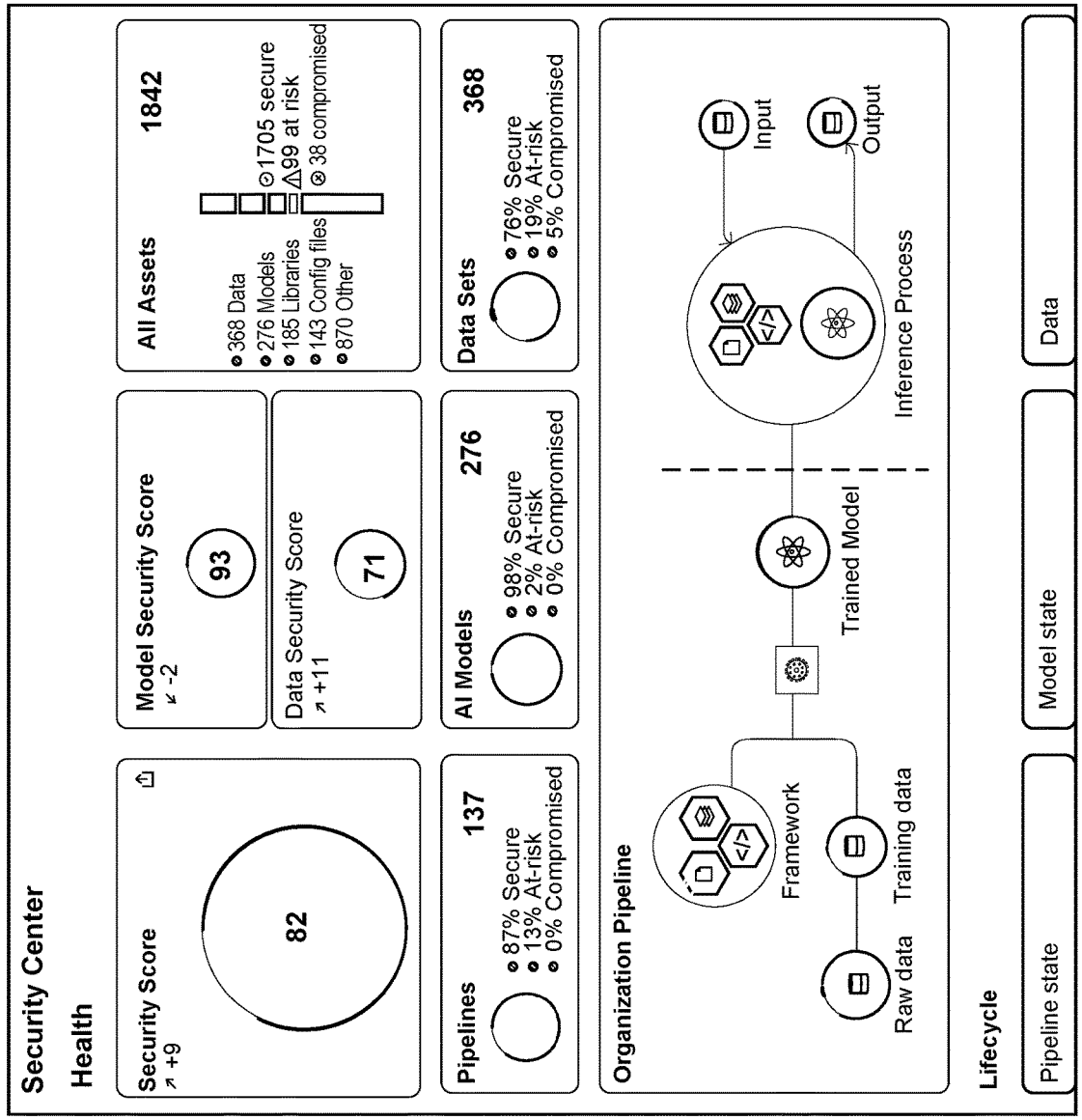
FIGS. 8A and 8B are exemplary illustrations of a security center interface, according to an embodiment of the present invention.
Figure 8B:
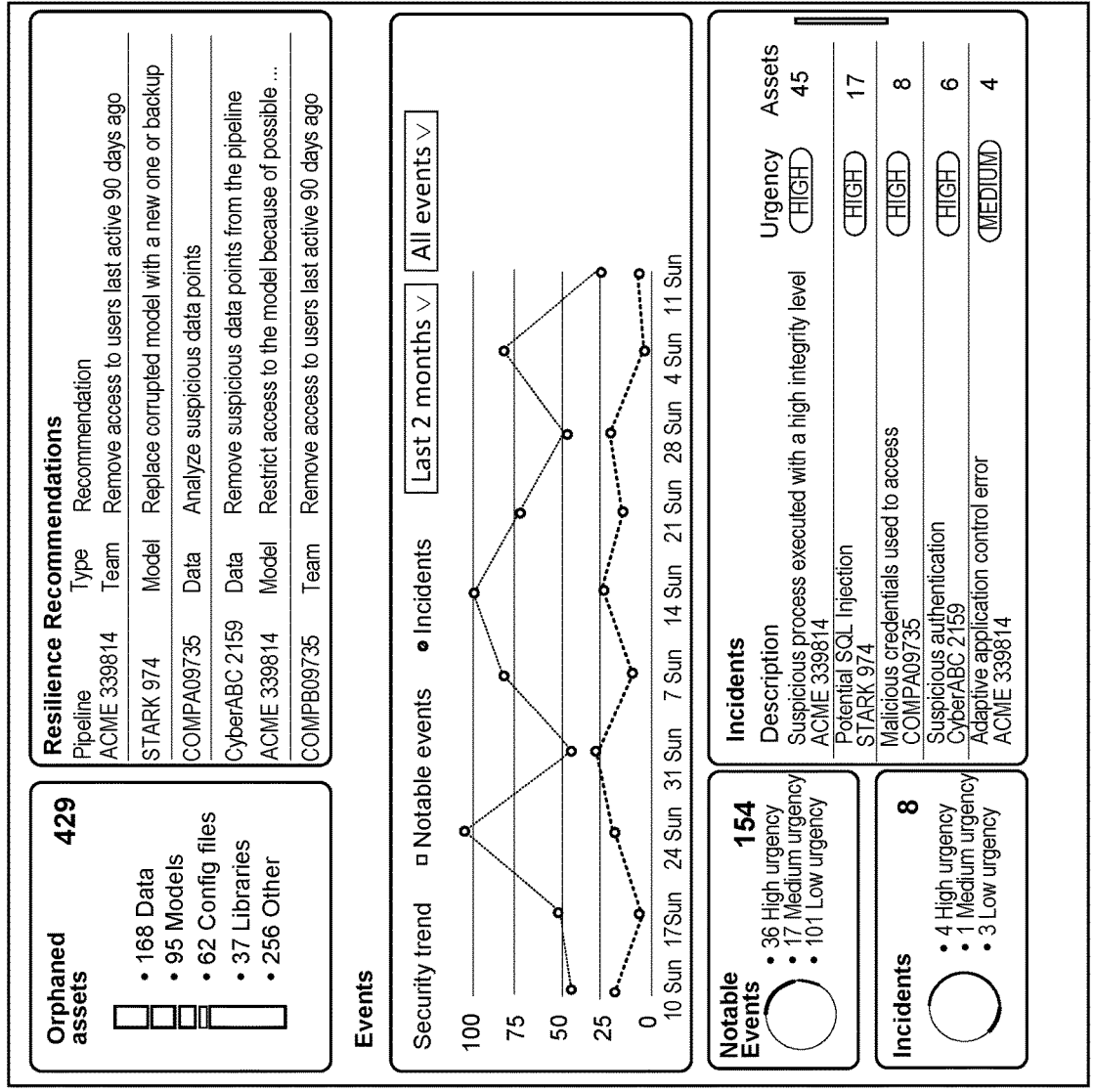

FIGS. 8A and 8B are exemplary illustrations of a security center interface, according to an embodiment of the present invention. FIGS. 8A and 8B illustrate a high level overview of a company's overall AI pipeline health; visibility into AI assets; status of AI notable events and incidents. An embodiment of the present invention is directed to determining whether AI pipelines are behaving appropriately; whether AI pipelines have been compromised; and downstream and business effects of compromise.

As shown in FIG. 8A, a Security Center interface may provide details relating to Health of a particular AI system. Health may be assessed based on various metrics including Security Score, Model Security Score, Data Security Score, All Assets, Pipelines, AI Models, and Data Sets. Organization Pipeline details may be provided. By providing an overview of key security indicators, FIGS. 8A and 8B assist users to quickly identify areas of concern and better understand the impact of any issues regarding performance.

Security Score may represent a measure of security posture of a pipeline based on an algorithm that incorporates incidents, alerts, and security findings. Model Security Score may calculate the security score (e.g., 0-100) across models associated with this pipeline. Data Security Score may calculate the security score (e.g., 0-100) across datasets associated with this pipeline. All assets represents a total count and breakdown of assets associated with this pipeline. Pipeline provides a visual representation of all assets within this pipeline and their respective security rating.

According to an embodiment of the present invention, Security Score may be based on criticality of pipelines, where higher criticality leads to a greater impact from Incidents, Alerts and Security Findings.

According to an embodiment of the present invention, Security Score may be calculated for an Individual Asset, Single Pipeline, Multiple Pipelines, etc. For an individual asset, Security Score may consider Incident Impact; Alert Impact and/or Security Finding Impact.

For Incident Impact, an impact score for an individual Incident may be calculated by taking the scoring matrix value corresponding to the Incident's severity and confidence rating. The overall Incident impact score for an asset may be calculated as the maximum of all individual Incident impact scores. For example, if an asset has two Incidents, one with moderate severity and high confidence, and another with high severity and moderate confidence, then the overall Incident impact score for the asset would be 0.9. Assets with no Incidents would have a score of 0.

For Alert Impact, an impact score for an individual Alert may be calculated by taking the scoring matrix value corresponding to the Alert's priority and confidence rating. The overall Alert impact score for an asset is calculated as the maximum of all individual Alert impact scores. For example, if an asset has two Alerts, one with moderate priority and high confidence, and another with high priority and moderate confidence, then the overall Alert impact score for the asset would be 0.9. Assets with no Alerts would have a score of 0.

For Security Finding Impact, an impact score for an individual Security Finding may be calculated by taking the scoring table value corresponding to the Security Finding's severity rating. The overall Security Finding impact score for an asset is calculated as the maximum of all individual Security Finding impact scores. For example, if an asset has two Security Findings, one with moderate severity, and another with high severity, then the overall Security Finding impact score for the asset would be 1.0. Assets with no Security Findings would have a score of 0.

For a Single Pipeline, the Security Score may be calculated by taking a weighted average of each asset associated with the pipeline.

For Multiple Pipelines, the Security Score may be calculated by taking a weighted average of each pipeline. If an asset is present in multiple pipelines, it may have scores specifically for each pipeline of which it is a member. For example, if an asset A1 is present in two pipelines P1 and P2, with P1 having a higher criticality level compared to P2, the incidents and alerts associated with A1 in pipeline P1 may differ from those in pipeline P2.

As shown in FIG. 8B, Security Center Interface may provide data relating to Orphaned Assets and Resilience Recommendations. Security Trend provides a graphic (e.g., line chart) of the number of Notable Events and Incidents over a given time period. Notable Events risks breakdown may be divided into High, Moderate, and Low Urgency. Incidents risks breakdown may be divided into High, Moderate, and Low Urgency. Incidents List represents a graphic (e.g., table) that displays a top number of incidents sorted by urgency and number of assets.

Figure 9:
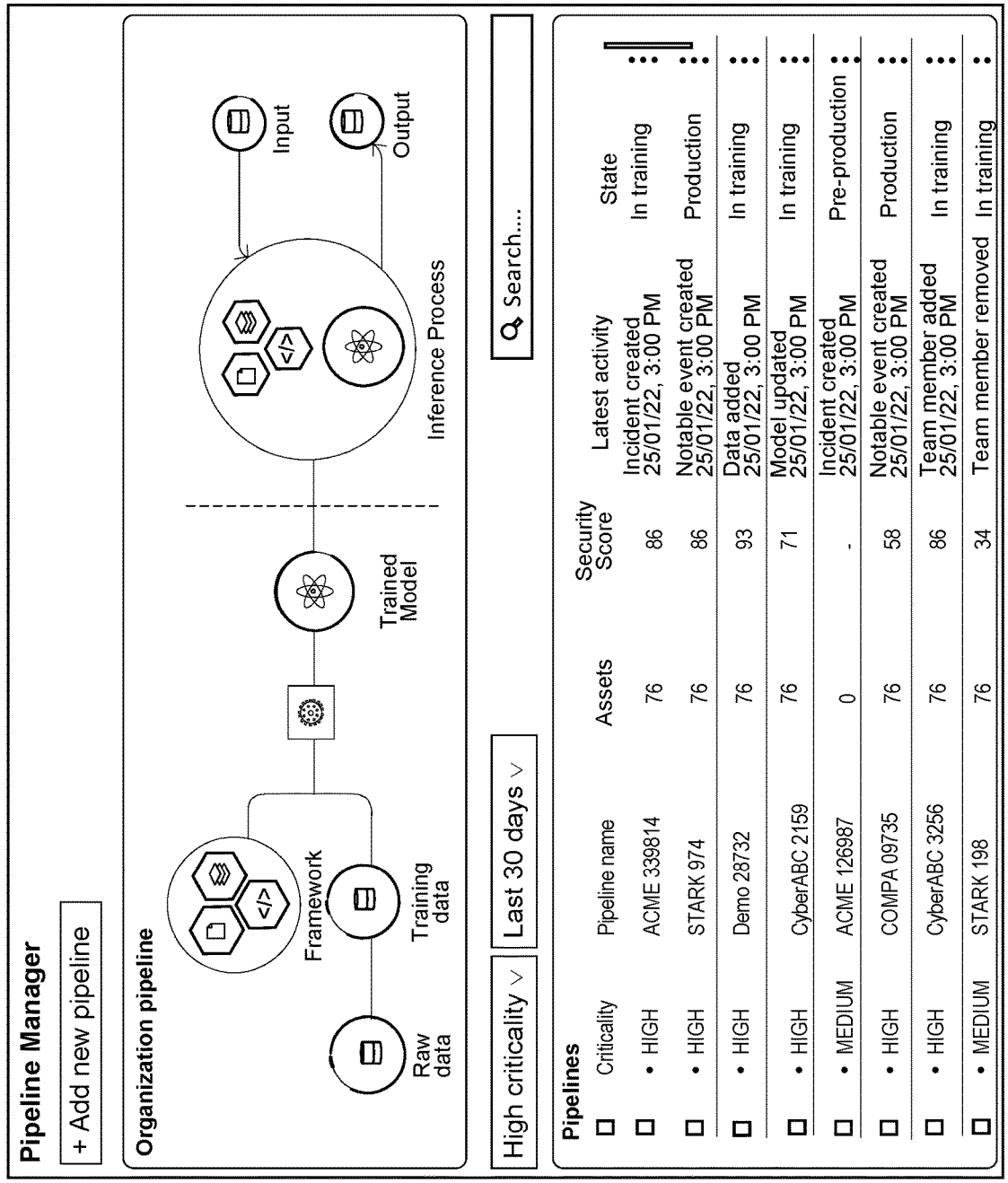
FIG. 9 is an exemplary illustration of a pipeline manager interface, according to an embodiment of the present invention.

FIG. 9 is an exemplary illustration of a pipeline manager interface, according to an embodiment of the present invention. As shown in FIG. 9, new pipelines may be added. Organization Pipeline details may be shown graphically. Other data may be provided, including criticality, pipeline name/identifier, assets, security score, latest activity, state, etc.

Figure 10:
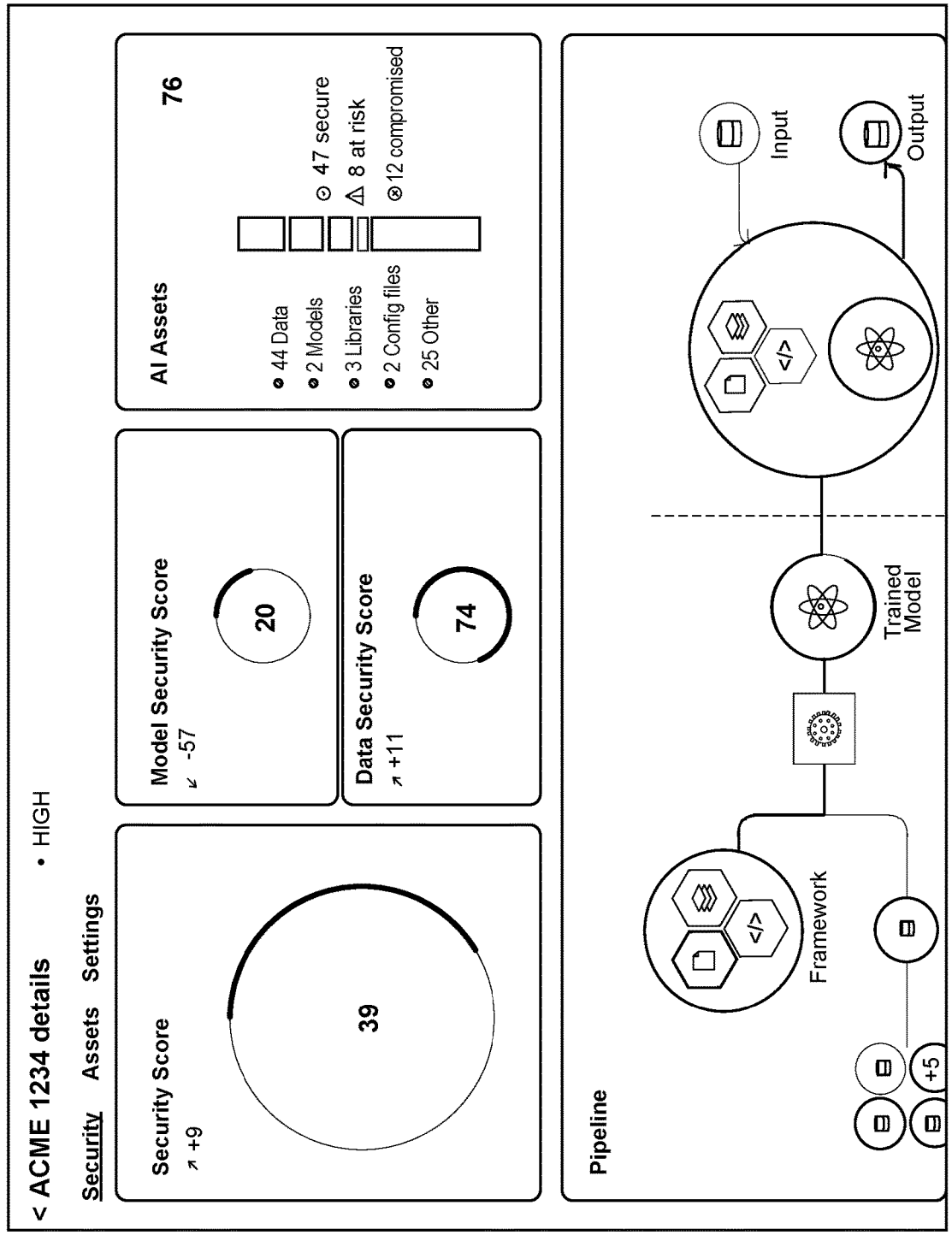
FIG. 10 is an exemplary illustration of an entity details interface, according to an embodiment of the present invention.

FIG. 10 is an exemplary illustration of an entity details interface, according to an embodiment of the present invention. Entity details may include Security, Assets, and Settings. Security details may include Security Score, Model Security Score, Data Security Score and AI Assets. Pipeline details may be graphically illustrated.

FIG. 11 is an exemplary illustration of a new pipeline creation interface, according to an embodiment of the present invention. Pipeline attributes may include: project and business criticality; associated data sets and models; cloud and other integrations; team members with varying access rights. Various users may be categorized as personas, which may include: data scientist, data science manager, AI engineer, AI development director, CISO, etc. As shown in FIG. 11, a user may provide pipeline name/identifier, description and other business data, such as business criticality.

FIG. 12 is an exemplary illustration of a notable events interface, according to an embodiment of the present invention. FIG. 12 provides an organized view to better understand notable events. Notable events may represent any event in AI pipeline with non-zero probability of being malicious activity. Notable events may be broken down by: urgency, type, criticality and confidence of bad actor's involvement. FIG. 12 illustrates notable events, affected assets, high urgency, medium urgency and low urgency. Other variations in thresholds for urgency may be applied. Filters, such as All Pipelines, Last 7 Days, and Active Events may be available. Activity details may include Urgency level, Pipeline, Type of event; subject of event; criticality; confidence and date/time.

FIG. 13 is an exemplary illustration of a suspicious activity interface, according to an embodiment of the present invention. Details may include: pipeline affected; urgency; status; criticality level; confidence score; team; type of suspicious activity; description; affected assets; and recommended next steps. Activity Log details may also be provided.

FIG. 14 is an exemplary illustration of a business details interface, according to an embodiment of the present invention. Business Details may include: Criticality; Industry; Business Function and Project.

FIG. 15 is an exemplary illustration of a cloud assets interface, according to an embodiment of the present invention. Cloud Assets may include details relating to Pipelines; Models; and Datasets.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A system for implementing an artificial intelligence (AI) security platform, the system comprising:
    a security center platform that serves as a central administrative software-as-a-service (SaaS) portal and collects and aggregates telemetry data across one or more AI implementations;
    an interactive user interface that is configured to provide an analytics dashboard to track the one or more AI implementations and identify one or more adversarial security issues; and
    a computer server that comprises a computer processor coupled to the interactive user interface and the security center platform wherein the computer server further comprises:
        a data integrity module configured to provide data security and integrity in the one or more AI implementations and further provide adversarial protection;
        a platform configuration monitoring interface configured to provide configuration monitoring associated with the one or more AI implementations; and
        a model security module configured to provide insights on how one or more models are performing from a security perspective and further provide model awareness and abnormal model behavior analytics.

2. A system for implementing an artificial intelligence (AI) security platform, the system comprising:
    a core security platform that comprises a computer processor that communicates with an API gateway, a container orchestration platform and at least one memory component;
    an interface that communicates with one or more collector agents that receive data from one or more AI Services;
    an asset discovery engine configured to collect metadata relating to one or more assets used for development and delivery of at least one AI pipeline, wherein the metadata relates to asset types, activity, data source and model; and
    an analysis engine configured to monitor the one or more AI Services, the one or more assets and the at least one AI pipeline to identify potential threats from adversarial attacks by generating at least one security score that measures a security posture of an entity wherein the at least one security score is based on one or more of: security incidents, alerts and security findings.

3. The system of claim 2, wherein the one or more collector agents operate in a customer environment.

4. The system of claim 2, wherein the at least one memory component comprises at least one service bus, at least one cache and at least one database.

5. The system of claim 2, wherein the at least one security score comprises: a model security score and a data security score.

6. The system of claim 2, wherein the interface is configured to display a graphical representation of an organization pipeline.

7. The system of claim 2, wherein the interface is configured to display a graphical representation of one or more: notable events and incidents.

8. The system of claim 2, wherein the interface is configured to display one or more resilience recommendations.

9. The system of claim 2, wherein the container orchestration platform comprises an operations management module, a reporting module, an inventory management module and an inventory monitoring module.

10. The system of claim 2, wherein the at least one security score is calculated by individual assets, individual pipelines or multiple pipelines.

11. A method for implementing an artificial intelligence (AI) security platform, the method comprising the steps of:
    communicating, via one or more collector agents, with one or more AI Services;
    collecting, via an asset discovery engine, metadata relating to one or more assets used for development and delivery of at least one AI pipeline, wherein the metadata relates to asset types, activity, data source and model;
    monitoring, via an analysis engine, the one or more AI Services, the one or more assets and the at least one AI pipeline to identify potential threats from an adversarial attack;
    generating, via the analysis engine, at least one security score that measure a security posture of an entity wherein the at least one security score is based on one or more of: security incidents, alerts and security findings; and
    providing, via an interface, security health data that represents the security posture of the entity wherein the security health data comprises the at least one security score.

12. The method of claim 11, wherein the one or more collector agents operate in a customer environment.

13. The method of claim 11, wherein the at least one memory component comprises at least one service bus, at least one cache and at least one database.

14. The method of claim 11, wherein the at least one security score comprises: a model security score and a data security score.

15. The method of claim 11, wherein the interface is configured to display a graphical representation of an organization pipeline.

16. The method of claim 11, wherein the interface is configured to display a graphical representation of one or more: notable events and incidents.

17. The method of claim 11, wherein the interface is configured to display one or more resilience recommendations.

18. The method of claim 11, wherein the container orchestration platform comprises an operations management module, a reporting module, an inventory management module and an inventory monitoring module.

19. The method of claim 11, wherein the at least one security score is calculated by individual assets, individual pipelines or multiple pipelines.

20. The method of claim 11, wherein the one or more collector agents communicates the asset discovery engine and the analysis engine and further communicates with a core platform that comprises a computer processor that communicates with an API gateway, a container orchestration platform and at least one memory component.

\* \* \* \* \*